United States Patent
Venkitaraman et al.

(10) Patent No.: US 9,854,328 B2
(45) Date of Patent: Dec. 26, 2017

(54) AUGMENTATION OF MULTIMEDIA CONSUMPTION

(75) Inventors: Narayanan Venkitaraman, Palatine, IL (US); Shirley A. Chaysinh, Grayslake, IL (US); Hiren M. Mandalia, Elk Grove Village, IL (US); Crysta J. Metcalf, Cary, IL (US); Ashley B. Novak, Chicago, IL (US); Isaac G. Kulka, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1265 days.

(21) Appl. No.: 13/542,696

(22) Filed: Jul. 6, 2012

(65) Prior Publication Data

US 2014/0009476 A1 Jan. 9, 2014

(51) Int. Cl.
| | |
|---|---|
| *H04N 21/81* | (2011.01) |
| *H04N 21/41* | (2011.01) |
| *H04N 21/43* | (2011.01) |
| *H04N 21/4722* | (2011.01) |
| *H04N 21/84* | (2011.01) |
| *H04N 21/8547* | (2011.01) |
| *G06T 19/00* | (2011.01) |

(52) U.S. Cl.
CPC ..... *H04N 21/8133* (2013.01); *H04N 21/4126* (2013.01); *H04N 21/4307* (2013.01); *H04N 21/4722* (2013.01); *H04N 21/84* (2013.01); *H04N 21/8547* (2013.01); *G06T 19/006* (2013.01)

(58) Field of Classification Search
CPC ........ G06T 19/006; G06T 2207/20212; H04N 21/4516; H04N 21/44008; H04N 21/8133; H04N 21/4722; H04N 21/4307; H04N 21/4126

USPC ................................................. 345/629, 633
See application file for complete search history.

(56) References Cited

U.S. PATENT DOCUMENTS

| | | | |
|---|---|---|---|
| 7,050,603 B2 | 5/2006 | Rhoads et al. | |
| 7,197,160 B2 * | 3/2007 | Rhoads et al. | 382/100 |

(Continued)

FOREIGN PATENT DOCUMENTS

WO     2011/019154 A2     2/2011

OTHER PUBLICATIONS

Bryant, Martin: "Interactive Augmented Reality TV tested in Germany",—The Next Web, thenextweb.com/eu/.../interactive-augmented-reality-tv-tested-in-germany/, Dec. 9, 2011, all pages.

(Continued)

*Primary Examiner* — Michelle L Sams
(74) *Attorney, Agent, or Firm* — Stewart M. Wiener

(57) ABSTRACT

Disclosed are methods and apparatus for augmenting a user's multimedia consumption experience. The methods comprise while the user is consuming the multimedia presentation using a first device, that device provides (to one or more remote processors) information that may be used to identify a relevant location. The one or more processors use this information to identify the location and acquire a virtual environment. This virtual environment may be a virtual representation the location. The virtual environment is presented to the user on a second (companion) device. Using the second device, the user may explore the virtual environment and interact with virtual objects therein.

20 Claims, 4 Drawing Sheets

(56) References Cited

U.S. PATENT DOCUMENTS

| | | | |
|---|---|---|---|
| 7,409,647 B2 | 8/2008 | Elber et al. | |
| 7,471,301 B2* | 12/2008 | Lefevre | 345/632 |
| 8,763,042 B2 | 6/2014 | Ishtiaq et al. | |
| 2002/0033845 A1 | 3/2002 | Elber et al. | |
| 2004/0222988 A1* | 11/2004 | Donnelly | 345/419 |
| 2005/0285878 A1 | 12/2005 | Singh et al. | |
| 2008/0074424 A1* | 3/2008 | Carignano | 345/473 |
| 2009/0109240 A1 | 4/2009 | Englert et al. | |
| 2009/0225026 A1* | 9/2009 | Sheba | 345/156 |
| 2010/0205628 A1* | 8/2010 | Davis et al. | 725/25 |
| 2010/0304804 A1 | 12/2010 | Spivack | |
| 2011/0018903 A1 | 1/2011 | Lapstun et al. | |
| 2011/0063415 A1* | 3/2011 | Gefen et al. | 348/43 |
| 2011/0064387 A1 | 3/2011 | Mendeloff et al. | |
| 2011/0138416 A1 | 6/2011 | Kang et al. | |
| 2011/0216090 A1 | 9/2011 | Woo et al. | |
| 2011/0217962 A1 | 9/2011 | Leung | |
| 2012/0017236 A1 | 1/2012 | Stafford et al. | |
| 2012/0135784 A1 | 5/2012 | Lee et al. | |
| 2013/0314438 A1* | 11/2013 | Borcherdt | 345/629 |
| 2013/0347018 A1* | 12/2013 | Limp et al. | 725/19 |
| 2014/0176604 A1 | 6/2014 | Venkitaraman et al. | |

OTHER PUBLICATIONS

Wikipedia, The Free Encyclopedia: "James Cameron's Avatar: The Game", en.wikipedia.org/wiki/James_Cameron's_Avatar:_The_Game, Dec. 9, 2011, all pages.

PCT Search Report & Written Opinion (dated Oct. 2, 2013), RE: Application No. PCT/US2013/049430.

EPC Examination Report, RE: Application No. 13737968.1, dated Aug. 22, 2016.

* cited by examiner

US 9,854,328 B2

AUGMENTATION OF MULTIMEDIA CONSUMPTION

FIELD OF THE INVENTION

The present invention is related generally to augmenting a user's multimedia consumption experience.

BACKGROUND OF THE INVENTION

The consumption of media presentations (e.g., TV programs, movies, etc.) by consumers is common. Here, the terminology "media presentation" or "multimedia presentation" is used to refer to any digital content, including but not limited to video, audio, and interactive files. Also, the terminology "consumption" is used to refer to any type of human interaction with a media presentation, including but not limited to watching, listening to, and interacting with.

In a separate field, augmented-reality techniques that augment a view of a physical, real-world environment, e.g., by overlaying video, graphics, or other information (e.g., GPS data) onto the view of the real-world environment, are known.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
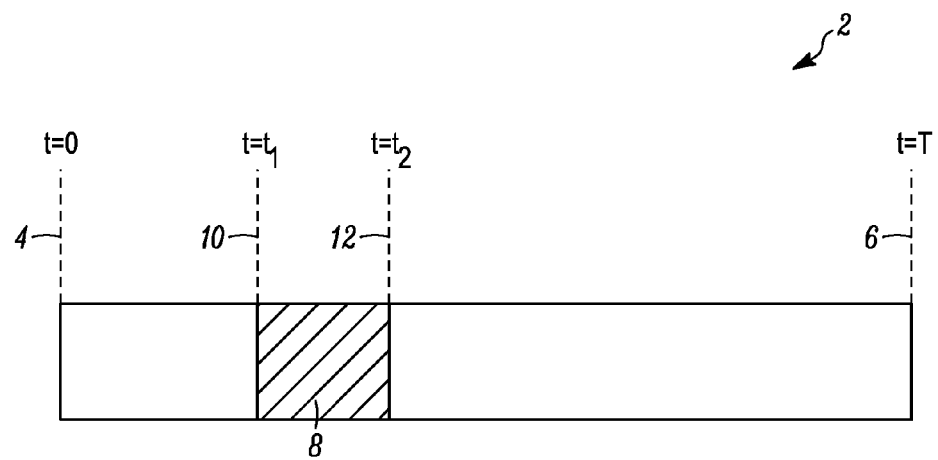
FIG. 1 is a schematic illustration (not to scale) showing a TV program.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Embodiments of the present invention include methods and apparatus for augmenting a user's multimedia consumption experience (i.e., the experience of a consumer whilst consuming primary media). The multimedia presentation of which the user's consumption is to be augmented may, for example, be a video or audio presentation, a television (TV) program, a movie, or an eBook.

Augmentation of the user's multimedia consumption experience may comprise, whilst the user is consuming the multimedia presentation using a first device (e.g., a TV), that device (or a different entity, e.g., a server associated with that device) providing (e.g., to one or more processors remote from the first device) information that may be used by the one or more processors to identify a location (e.g., a location that is relevant to events occurring in the multimedia presentation). The provided information may comprise information by which the multimedia presentation, and the point or range in that multimedia presentation that is currently being consumed by the user, may be identified. The provided information may be in the form of a watermark (e.g., an audio or visual watermark that is undetectable by the user) that is present in the multimedia presentation.

The one or more processors may use the provided information to identify the location and acquire (e.g., create or retrieve from somewhere) a virtual environment (e.g., a three-dimensional virtual environment). This virtual environment may be a virtual representation of the identified location and may be formed, for example, by compiling images of that location to form a panorama of that location.

The virtual environment may be presented to the user on a second device (i.e., a device that may be different from the first device, e.g., a tablet computer or smartphone). Using the second device, the user may explore the virtual environment and interact with virtual objects placed therein. These objects may have been overlaid onto the virtual environment using an augmented-reality process (e.g., as provided by the Argon™ augmented-reality web-browser which may, for example, operate on the second device). The user may also interact with other users who are exploring the virtual environment at the same time.

Apparatus for implementing any of the below described arrangements and for performing any of the below described method steps may be provided by configuring or adapting any suitable apparatus, for example one or more computers or other processing apparatus or processors, or by providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

It should be noted that certain of the process steps depicted in the below described process flowcharts may be omitted or such process steps may be performed in an order differing from that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the figures, FIG. 1 is a schematic illustration (not to scale) showing a TV program 2. The TV program 2 is used herein to illustrate embodiments of a process of augmenting a consumer's experience when he consumes a media presentation or other multimedia content. This process is hereinafter referred to as the "experience-augmentation process" and is described in more detail below with reference to FIG. 4. It will be appreciated that in other embodiments the experience-augmentation process may be implemented with a different type of media presentation (e.g., a movie, an eBook, a radio broadcast, etc.).

The TV program 2 may be consumed by a consumer using any appropriate client device (e.g., a laptop computer, a tablet computer, or a television). The TV program 2 runs from its start time 4 at time t=0 to its end time 6 at time t=T. In embodiments in which the media presentation is, e.g., an eBook, the media presentation may run from 'page 1' to 'page N' (where N is the number of pages in the eBook).

Thus, as opposed to being time-based media, a media presentation may be non-time-based. The media presentation may also comprise a multi-device presentation, i.e., a multimedia presentation to be shown on more than one different device. For example, the media presentation may comprise a slide presentation to be shown by one device and a video presentation to be shown by another device.

A scene in the TV program 2 (hereinafter referred to as the "scene" and shown in FIG. 1 as a shaded region of the TV program 2 and indicated by the reference numeral 8) has start and end demarcation points (indicated in FIG. 1 by the reference numerals 10 and 12 respectively). The start demarcation point 10 of the scene 8 occurs in the TV program 2 at time t=t1. The end demarcation point 12 of the scene 8 occurs in the TV program 2 at time t=t2. The start demarcation point 10 may be any time point in the TV program 2 between t=0 and t=T. The end demarcation point 12 may occur at any time point in the TV program that is equal to or later than the start demarcation point 10. The scene 8 of the TV program 2 takes place in a certain location (e.g., a railway station or an airport). In other words, during the scene 8, the action takes place in a certain location. The location at which the scene 8 takes place may be a fictional or non-fictional place. In another instance, the dialog in the scene, or closed captions relating to that scene, may refer to a particular location.

Figure 2:
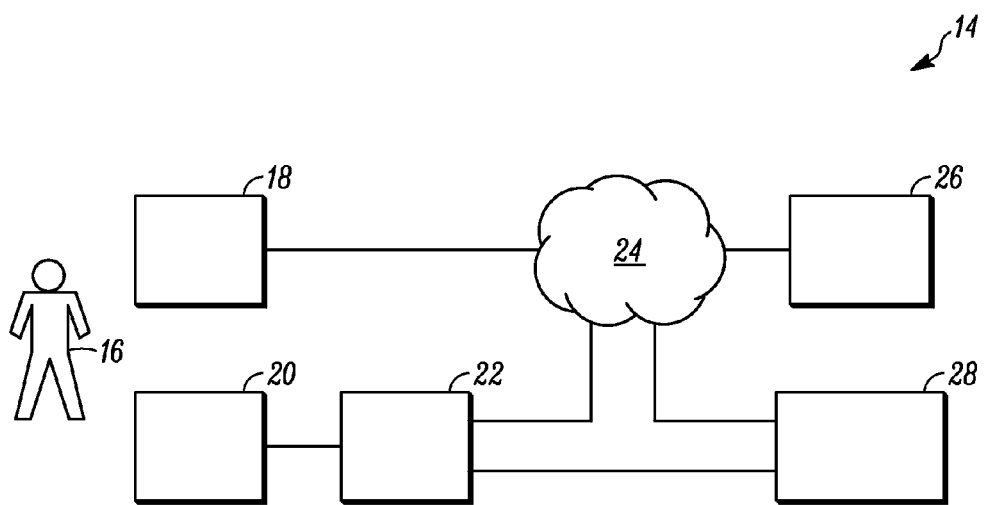
FIG. 2 is a schematic illustration (not to scale) of an example network in which an experience-augmentation process is implemented.

FIG. 2 is a schematic illustration (not to scale) of an example network 14. The experience-augmentation process, as performed by the entities of the network 14, is described in more detail below with reference to FIG. 4.

The representative network 14 comprises a user 16, a tablet computer 18 (in other embodiments a different companion device may be used), a television 20, a set-top box 22, the Internet 24, a service module 26, and a multimedia content provider 28.

The user 16 is a user or operator of the tablet computer 18 and the TV 20. For example, the user 16 may browse the Internet 24 using the tablet computer 18 and may watch the TV program 2 on the TV 20.

The tablet computer 18 is a conventional tablet computer. The tablet computer 18 is coupled to the service module 26 via the Internet 24 (e.g., using Wi-Fi Internet access). This coupling is such that information may be sent from the tablet computer 18 to the service module 26 and vice versa. For example, images may be sent from the service module 26 to the tablet computer 18 for display to the user 16. In other embodiments, a different type of device may replace the tablet computer 18, e.g., a different type of computer (e.g., a laptop computer or a "smartphone"). The tablet computer 18 is described in more detail below with reference to FIG. 5.

The TV 20 is a conventional television on which, in operation, media content (e.g., the TV program 2) received from the set-top box 22 is displayed to the user 16. The set-top box 22 may receive the media content (e.g., the TV program 2) from the content provider 28. The TV 20 is also coupled to the service module 26 via the set-top box 22 and the Internet 24. This coupling is such that information may be sent from the TV 20 to the service module 26 and vice versa. Also, information may be sent from the set-top box 22 or from the content provider 28 to the service provider 26 and vice versa. For example, information relating to the TV program 2 being displayed to the user 16 on the TV 20 may be sent from the set-top box 22 to the service module 26.

The service module 26 is used to perform the experience-augmentation process to augment the user's experience of watching the TV program 2 on the TV 20. In other words, the service module 26 is used to provide the user 16 with an experience-augmentation service.

Figure 3:
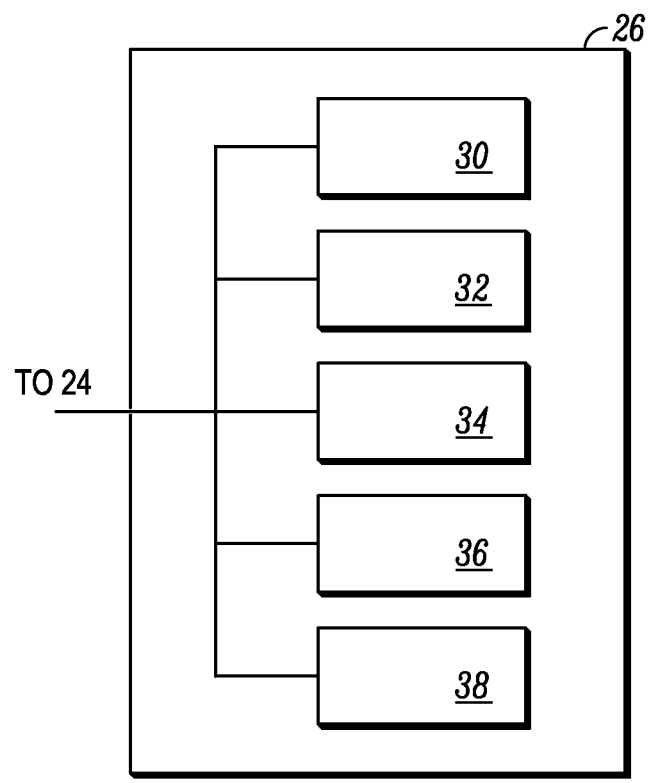
FIG. 3 is a schematic illustration (not to scale) of a service module.

FIG. 3 is a schematic illustration (not to scale) of the service module 26.

The service module 26 comprises a location-identification module 30, a location-image module 32, an object-identification module 34, an object-position module 36, and a user-presence module 38.

The modules 30 through 38 of the service module 26 are used to perform the experience-augmentation process to augment the user's experience of watching the TV program 2 on the TV 20. The functionality of each of these modules 30 through 38 is described in more detail in the description of the experience-augmentation process (which is described below with reference to FIG. 4). The modules 30 through 38 of the service module 26 are coupled together such that information may be sent among those modules 30 through 38 as described in more detail below. Also, the modules 30 through 38 of the service module 26 are connected to the Internet 24 (e.g., via a wired or wireless link) such that information may be sent among these modules 30 through 38 and each of the tablet computer 18 and the TV 20, as described in more detail below with reference to FIG. 4.

Figure 4:
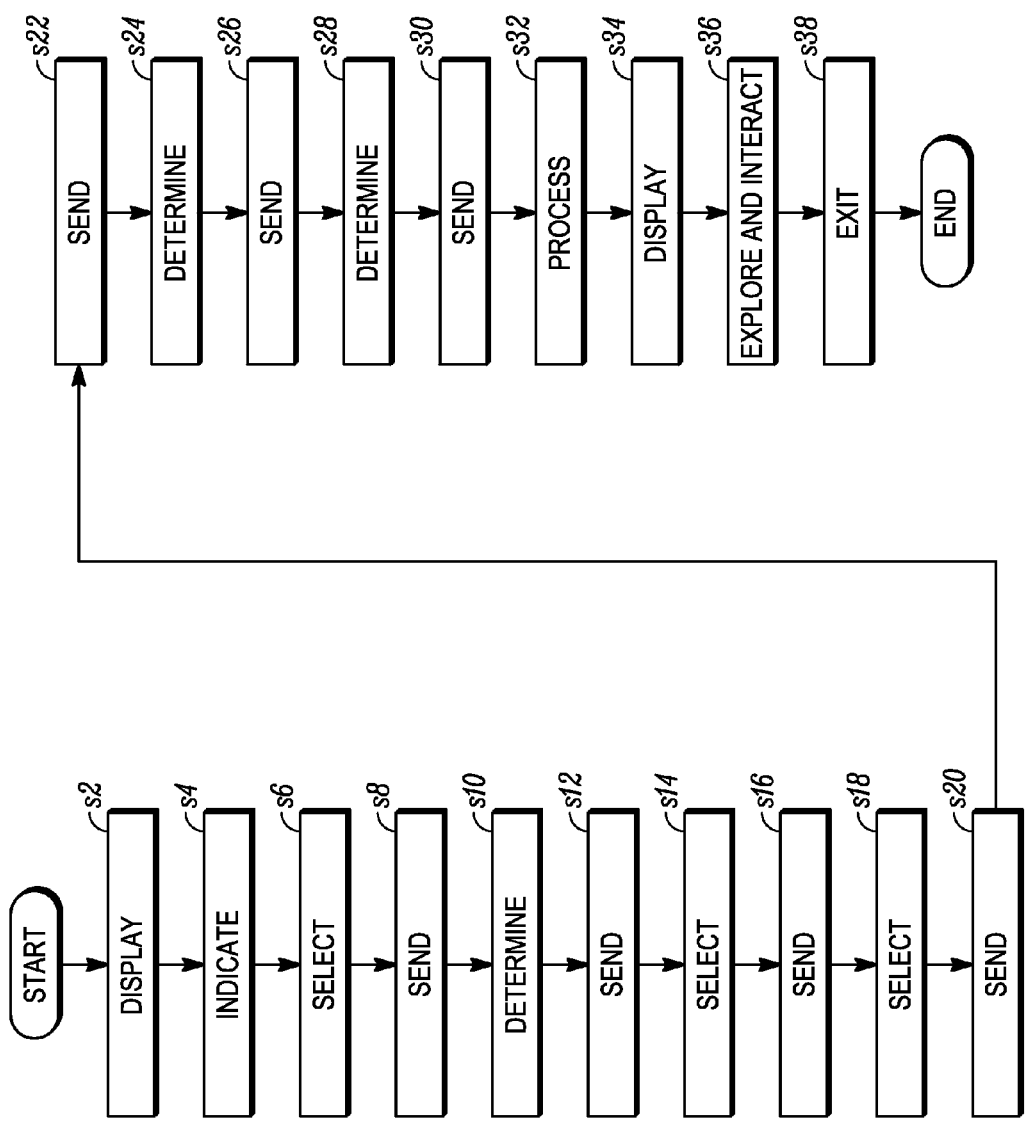
FIG. 4 is a process flow chart showing certain steps of the experience-augmentation process.

FIG. 4 is a process flow chart showing certain steps of a process of the experience augmentation as performed by the entities of the network 14.

At step s2, the TV program 2 is displayed on the TV 20 to the user 16.

At step s4, as the user 16 watches the TV program 2 on the TV 20, it is indicated to the user 16 (e.g., by displaying an icon on the TV 20) that an experience-augmentation service is available for some or all of the TV program 2. In this embodiment, the experience-augmentation service is available for the scene 8 of the TV program 2. In other embodiments, availability of the experience-augmentation facility may be indicated to the user 16 in a different way, for example a visual cue or an audible announcement may be made to the user 16 via the TV 20 or via the tablet computer 18 prior to the commencement of the TV program 2.

At step s6, the user 16 indicates that he wishes for the experience-augmentation service for the scene 8 to be provided to him. The user 16 may do this in any appropriate way, for example by selecting the service using a remote control for the TV 20 or by logging into an account for the experience-augmentation service using the tablet computer 18.

At step s8, an identifier for the TV program 2 (i.e., data by which the TV program 2 can be identified) and an identifier for the scene 8 (i.e., data by which the scene 8 within the TV program 2 can be identified) are sent from the TV 20 (or from, for example, the set-top box 22) to the location-identification module 30 of the service module 26. The identifier for the scene 8 may be, for example, an indication of the current time in the TV program 2 (e.g., t=t1). In other embodiments, the tablet computer 18 tracks the current location of the program using techniques such as audio signatures or periodic time-sync communication with the TV 20. The tablet computer 18 then, in turn, obtains the information needed to present the augmented experience for the current scene from the service module 26.

At step s10, using the received TV program identifier and scene identifier, the location-identification module 30 determines the location corresponding to the scene 8, for instance the location at which the scene 8 in the TV program 2 takes place or the location referred to in scene dialog. For example, if, during the scene 8, the action takes place in a specific airport, using the TV program and scene identifiers, the location-identification module 30 identifies that specific airport. This identification of the scene location may be performed in any appropriate way, for example, using a look-up table (e.g., a look-up table stored on the location-identification module 30 or accessible by the location-identification module 30 via the Internet 24) that matches TV program and scene identifiers to locations.

At step s12, a location identifier corresponding to the identified location (i.e., the location at which the scene 8 occurs) is sent from the location-identification module 30 to each of the following modules: the location-image module 32, the object-identification module 34, and the user-presence module 38.

At step s14, using the location identifier, the location-image module 32 selects a series of images of the location at which the scene 8 occurs. This image-selection process may be performed in any appropriate way, for example, by selecting images from an image repository (e.g., a look-up table stored on the location-image module 32 or accessible by the location-image module 32 via the Internet 24) that contains images of a number of different scene locations and corresponding location identifiers. The series of images of the location are such that those images may be used to construct a panoramic image (e.g., a 360° image) of the location. The images may be three-dimensional images. For example, the images may be positioned, e.g., adjacent to each other or overlapping to some extent, to form an image of the location that is larger than any of the individual images of the series. In other embodiments, the image may have tags indicating view facing, latitude, longitude, altitude information, etc. The different facings may be combined together to create a panoramic view.

At step s16, the selected images are sent from the location-image module 32 to the tablet computer 18. Processing of the images by the tablet computer 18 is described in more detail below at step s32.

At step s18, using the location identifier, the object-identification module 34 selects a number of (digital) objects associated with the location at which the scene 8 in the TV program 2 takes place. These objects are digital representations of real objects. The objects, how they are displayed to the user 16, and how the user 16 may interact with them are described in more detail below. The objects associated with the location may be objects that one would expect to find at such a location. (For example, if the location were an airport, then an object may be a suitcase. Likewise, if the location were a railway station, then an object may be a train ticket.) This object-selection process may be performed in any appropriate way, for example, by selecting digital objects from an object repository (e.g., a look-up table stored on the object-identification module 34 or accessible by the object-identification module 34 via the Internet 24) that contains a number of different objects and corresponding location identifiers.

The selection of the objects performed at step s18 may be dependent upon the TV program 2 or on the current scene 8. For example, object selection may be performed depending upon the TV program or scene identifiers. Thus, an object that is in some way associated or relevant to events occurring in the scene may be selected. In other embodiments, the objects may be selected based on metadata identifying the objects and their respective positions at different times within the media. In other embodiments, dynamic schemes such as watermarks in the media, text analysis of closed-caption information in the media, video object detection, or depth analysis for 3D video may also be used. Additionally, as events unfold in the scene 8, the virtual objects may be updated to reflect the change. For example, when an object falls down in the scene 8, a virtual object may (e.g., temporarily) be placed in the virtual environment and, if the object gets picked up by someone in the scene 8, then the virtual object may be removed from the virtual environment. This may be done by using meta-data that provide information about when objects enter or exit a scene. Alternatively, this may be done using media analysis processes which use object encoding and detection schemes to determine entry and exit of objects from a scene 8.

Similarly, changes made in the virtual environment may also affect the TV program 2. For example, if a user removes an object from the virtual environment, the TV program 2 may show the protagonist searching for, and being unable to find, the relevant object. In other embodiments, the TV program 2 may be prepared so that it has multiple possible story lines. When a user interacts with a virtual object, information relating to this interaction may be transmitted to the object-position module 36 in the service module 26. The object-position module 36 may then determine whether an alternate story path should be chosen for the TV program 2, and, if so, may notify the content provider 28. The content provider 28 may then alter the content stream that is being transmitted to the content viewing device (i.e., the TV 20).

At step s20, the selected (digital) objects are sent from the object-identification module 34 to the tablet computer 18. Processing of the objects by the tablet computer 18 is described in more detail below at step s32. In other embodiments, for example in the case of a live event (e.g., in the case where the TV program 2 is a "live" TV program), (digital) objects may be derived from the media itself using a known object-image extraction scheme. In other embodiments, a type of object may be determined directly from the TV program 2, e.g., using a known object-extraction scheme, and a corresponding virtual object may be retrieved from the object-identification module 34.

At step s22, an object identifier corresponding to each of the selected objects (i.e., information by which an object can be identified) is sent from the object-identification module 34 to the object-position module 36.

At step s24, for each of the selected objects, using the object identifier associated with that object, the object-position module 36 determines a position for that object within the panoramic image of the location that may be formed from the series of images that were selected by the location-image module 32 at step s14. This position-determination process may be performed in any appropriate way, for example, by selecting a position from a position repository (e.g., a look-up table stored on the object-position module 36 or accessible by the object-position module 36 via the Internet 24) that contains a number of different object positions and corresponding object identifiers. An object position within the panoramic image of the location may, for example, be specified by x- and y-coordinates of points within that panoramic image. In other embodiments, a location (e.g., as provided by latitude, longitude, and altitude information) and an orientation (e.g., as provided by information specifying angles of rotation along x,y,z directions) can be associated with an object. Such information may then be used to place the object.

At step s26, the positional information for each of the objects is sent from the object-position module 36 to the tablet computer 18. Processing of the objects by the tablet computer 18 is described in more detail below at step s32.

At step s28, using the location identifier, the user-presence module 38 determines whether the experience-augmentation service for the scene 8 is being provided to, or has been provided to, other users (e.g., other consumers of the TV program 2). Information relating to such other users (for example an avatar for another user, position information specifying a position for another user's avatar in the panoramic image of the location, etc.) may also be determined.

At step s30, the information relating to other users that is determined at step s28 is sent from the user-presence module 38 to the tablet computer 18. Processing of this information by the tablet computer 18 is described in more detail below at step s32.

At step s32, the tablet computer 18 processes the selected images (sent to the tablet computer from the location-image module 32 at step s16), the selected (digital) objects (sent to the tablet computer 18 from the object-identification module 34 at step s20), the position information for the objects (sent to the tablet computer 18 from the object-position module 36 at step s26), and the information relating to other users (sent to the tablet computer 18 from the user-presence module 38 at step s30).

The selected images may be processed by the tablet computer 18 to compile those images into a panoramic view (e.g., a 360° view) of the location. The selected images may be used to create a three-dimensional space (representative of the scene location) that the user 16 may explore as described in more detail below at step s36. In other words, the tablet computer 18 "stitches together" the images to create a panoramic image of the location that is larger than any single image.

The object positions and the objects may be processed by the tablet computer 18 so that each object (i.e., each digital representation of a real object) is inserted into or overlaid onto the panoramic image at the specified position. This insertion and overlaying of the objects onto the panoramic image may be performed in any appropriate way, for example, the Argon™ augmented-reality web-browser may be used.

The information relating to other users may be processed to include, e.g., overlay, an image of an avatar of each of the other users that the experience-augmentation service for the scene 8 is being provided to. Any positional information for the other users may be used to position those avatars relative to panoramic image. This insertion and overlaying of the avatars of the other users may be performed in any appropriate way, for example, the Argon™ augmented-reality web-browser may be used.

At step s34, some of, or the entire, panoramic image of the location, and the inserted and overlaid objects and user avatars, are displayed to the user 16 on the screen of the tablet computer 18.

Figure 5:
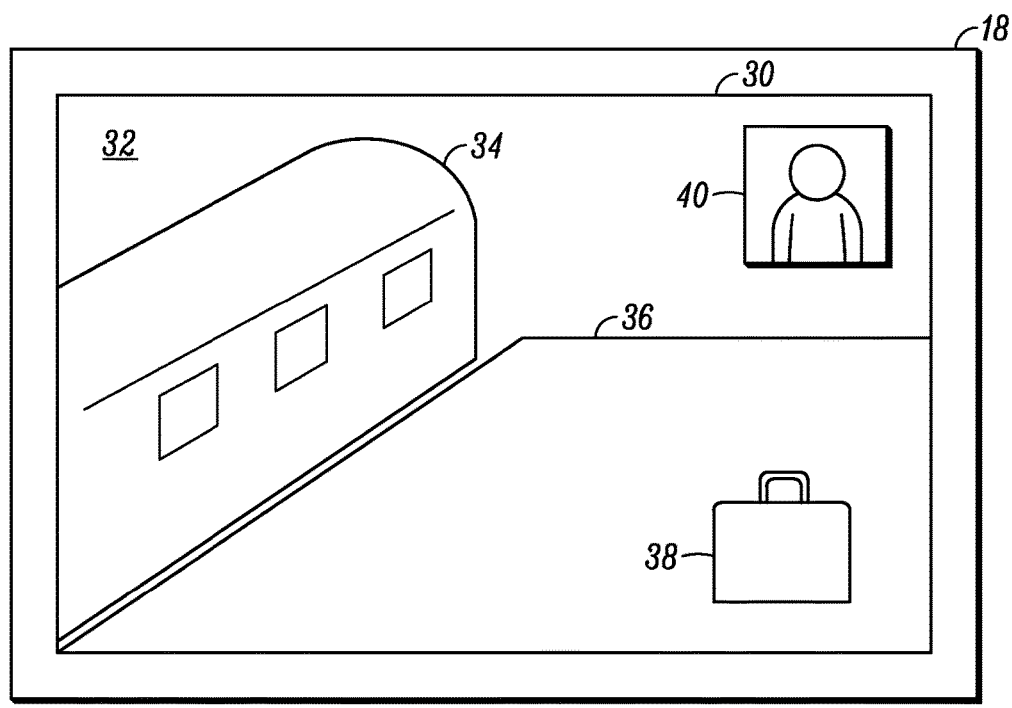
FIG. 5 is a schematic illustration of a tablet computer displaying a scene location.

FIG. 5 is a schematic illustration of the tablet computer 18 displaying (on a touch-screen display 30) a portion 32 of the panoramic image of a location of the scene 8. In this example, the location of the scene is a railway station. The portion 32 of the panoramic image that is currently being displayed comprises an image of a train 34 and an image of a railway platform 36. An object 38 that has been overlaid onto the panoramic image is also displayed. In this example, the object 38 is a digital representation of a suitcase. The object 38 has been positioned onto the railway platform 36. An avatar 40 of another user is also displayed. In this example, the avatar 40 is an avatar of a user who is a friend of the user 16 and who is currently being provided with the experience-augmentation service for the scene.

At step s36 of FIG. 4, the user 16 explores the location of the scene 8 and interacts with objects (e.g., the object 38) within the location. The user 16 may pause the TV program 2 whilst this exploration of the scene location takes place.

The user 16 may explore the scene location by using the tablet computer 18 to "navigate" around the displayed environment. For example, the user may change the portion of the panoramic image that is displayed on the tablet computer 18. This may be done to allow the user 16 to look at other areas of the location. The user 16 may do this in any appropriate way. For example, the user 16 may move the tablet computer 18 left or right which may move the view of the panoramic image (i.e., the displayed portion 32) left or right with respect to the panoramic image. For example, in the example shown in FIG. 5, the user may move, or tilt, the tablet computer 18 to the right, which would change the displayed portion 32 of the panoramic view to include more of the station platform 36 and less of the train 34. Also, the user 16 may explore the location of the scene 8 by scrolling the image by sliding his finger across the touch-screen display 30 of the tablet computer 18 (i.e., using his finger to cause the displayed graphics to move up, down, or across the display screen 30).

The user 16 may interact with an object 38, for example, by selecting that object 38 (e.g., by touching that object 38 on the touch-screen 30 of the tablet computer 18). User interaction with an object 38 may produce any appropriate effect. For example, in the example shown in FIG. 5, if the user 16 were to select (i.e., interact with) the object 38 (which is a suitcase), then the contents of the suitcase may be displayed to the user 16 on the display 30. This content may be relevant to the plot of the TV program 2, for example.

Thus, the user 16 may interact with objects 38 on the tablet computer 18 in order to find out information that is relative to the TV program 2 (for example, information that is relevant to the plot of the TV program 2, information that is relevant to events occurring in the scene 8).

Also, other types of information may be provided (in any appropriate way, e.g., audio, video, images overlaid onto the panoramic image of the location, etc.) to the user 16 when he interacts with an object 38. For example, the user 16 may be provided with information relating to other TV programs relating to the TV program 2, advertisement information, cast information for the TV program 2, etc.

The user 16 may interact with another user, for example, by selecting the avatar 40 of the other user (e.g., by touching that avatar 40 on the touch screen 30 of the tablet computer 18). User interaction with another user may produce any appropriate effect. For example, in the example shown in FIG. 5, if the user 16 were to select (i.e., interact with) the avatar 40, then profile or preference information of that other user may be displayed to the user 16 on the display 30. Also, any comments may by that other user may be displayed to the user 16. Also, interaction with the other user by the user 16 may initiate communication between the user 16 and the other user. The user 16 may input comments that may be displayed to other users, e.g., at a later time.

The user 16 may add other objects or information into the displayed environment, e.g., which may be interacted with at a later time by other users. Also, the user 16 may move objects to different positions in the displayed environment.

At step s38 of FIG. 4, after the user 16 has finished exploring the location of the scene 8 on the tablet computer 18, the user may "exit" the scene location, e.g., by selecting an "exit" icon on the display 30 or by logging-off from the experience-augmentation service.

Thus an experience-augmentation process is provided.

The above provided methods and system advantageously tend to provide that the user's experience of the TV program 2 is enhanced. For example, as the user 16 watches the scene 8, or after the user 16 has finished watching the scene 8, the user 16 may explore a digital representation of the scene location using a companion device (e.g., the tablet computer 18 or another device). The user 16 may interact with objects 38 that are relevant to the TV program 2 (e.g., by interacting with objects on the companion device, the user 16 may uncover clues or information that is relevant to that TV program 2).

The user 16 may advantageously interact with other users to whom the experience-augmentation service has been provided for the scene 8. This may be a live interaction. Alternatively, other users may have explored the scene location at some earlier time, and they may leave "notes" (i.e., upload comments) for the user 16 to view when the user 16 explores the scene location later. Also, the user 16 may interact with another user who is in the same location, but as part of a different TV program. For example, if the same railway station is being used in multiple episodes of a TV program, or as part of a different TV program, users may still be able to see and interact with other users in a virtual environment corresponding to that location. Thus, new inter-show experiences for users tend to be provided.

Furthermore, what is displayed on the tablet computer 18 may be advantageously linked to events occurring in the TV program 2.

The above described system and method advantageously tend to provide an augmented viewing experience for the user 16. The user 16 is able to explore locations in the TV program 2. This may be useful for promoting certain locations, e.g., as a tourist destination. The user 16 may also explore the scene locations to find out more information, e.g., about events that have occurred or will occur in the TV program 2 or in other related media presentations.

In the above embodiments, the user 16 explores the scene location using a tablet computer 18. However, in other embodiments, a different companion device may be used, for example, augmented 3D goggles. In other embodiments, primary media content may be provided (e.g., in augmented goggles) when the user 16 is facing in a particular direction or looking at a particular object. If the user 16 changes direction or orientation, then the primary media content may be paused, and the user 16 may be shown the virtual environment using the same device.

In the above embodiments, the locations images, object information, and other user information are delivered to the companion device as described above with reference to FIG. 4. However, in other embodiments, this information is provided to the companion device in a different way. For example, instead of the companion device being sent this information, the companion device may retrieve this information, e.g., via the Internet, from a web-server. For example, audio or visual watermarks in the TV program may be readable by the companion device, which may then be used by the companion to retrieve the relevant location images and object data from a remote server.

In the above embodiments, the user's experience of watching the TV program is augmented. However, in other embodiments, the user's experience of consuming a different type of media presentation (e.g., a movie, a song, an eBook) may be augmented using the experience-augmentation process.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method of augmenting a user's multimedia consumption experience, the user being a user of a first user device and of a second user device, the user using the first device to consume a multimedia presentation, the method comprising:
   providing, for use by one or more processors remote from the first device, information that may be used by the one or more processors to identify a location, the location being relevant to at least part of the multimedia presentation;
   identifying, by the one or more processors, the location;
   acquiring, by the one or more processors, a virtual environment, the virtual environment being representative of the identified location;
   acquiring, by the one or more processors, one or more virtual objects, each virtual object relating to at least part of the multimedia presentation;
   determining, by the one or more processors, for each virtual object, a position for that virtual object within the virtual environment;
   for each virtual object, including that virtual object in the virtual environment at the position within the virtual environment determined for that virtual object; and
   presenting to the user, using the second device, the virtual environment with the one or more virtual objects included therein;
   wherein the virtual environment is to some extent explorable by the user using the second user device; and
   wherein the virtual objects within the virtual environment are capable of being interacted with by the user.

2. A method according to claim 1:
   wherein each virtual object corresponds to an object within the multimedia presentation;
   the method further comprising changing one or more properties of a virtual object of the one or more virtual objects within the virtual environment in response to a change, in the multimedia presentation, to one or more properties of the object that corresponds to that virtual object.

3. A method according to claim 1:
   wherein each virtual object corresponds to an object within the multimedia presentation;
   the method further comprising, in response to the user interacting with a virtual object of the one or more virtual objects within the virtual environment, changing, in the multimedia presentation, one or more properties of the object that corresponds to that virtual object.

4. A method according to claim 1 wherein the location is a location at which events that occur in the multimedia presentation take place or that is referred to at some point in the multimedia presentation.

5. A method according to claim 4 wherein the location is a location at which events occurring in a portion of the multimedia presentation that is currently being consumed by the user take place or a location that is currently being referred to in a portion of the multimedia presentation that is currently being consumed by the user.

6. A method according to claim 1 wherein including comprises overlaying the one or more objects onto the virtual environment using an augmented-reality process.

7. A method according to claim 1 wherein the virtual environment is a three-dimensional virtual environment.

8. A method according to claim 1:
wherein the virtual environment is an environment in which the user may interact with a further user;
wherein the further user is a user of a further device; and
wherein the virtual environment is being presented or has been presented, using the further device, to the further user.

9. A method according to claim 1 wherein the information that may be used by the one or more processors to identify the location comprises first identification data, the first identification data identifying the multimedia presentation, and second identification data, the second identification data identifying a point or range in the multimedia presentation that is currently being consumed by the user.

10. A method according to claim 1 wherein a watermark that is present in a portion of the multimedia presentation comprises information that may be used by the one or more processors to identify the location.

11. A method according to claim 1 wherein acquiring the virtual environment comprises selecting one or more images of the identified location and forming the virtual environment using the selected images.

12. A method according to claim 1 wherein the virtual environment comprises a panoramic representation of the location.

13. A method according to claim 1 wherein the multimedia presentation is selected from a group of multimedia presentations consisting of: a video presentation, a television program, and a movie.

14. A method according to claim 1 wherein the first device is the same as the second device.

15. A method according to claim 14:
wherein the second device may be moved between having a first orientation and a second orientation;
wherein when the second device is positioned in the first orientation, the second device displays the multimedia presentation; and
wherein when the second device is positioned in the second orientation, the second device displays the virtual environment.

16. A method of augmenting a user's multimedia consumption experience, the user being a user of a first user device and of a second user device, the user using the first device to consume a multimedia presentation, the method comprising:
providing, for use by one or more processors remote from the first device, information that may be used by the one or more processors to identify a location, the location being relevant to at least part of the multimedia presentation;
identifying, by the one or more processors, the location;
acquiring, by the one or more processors, a virtual environment; and
presenting to the user, using the second device, the virtual environment;
wherein providing information that may be used by the one or more processors to identify a location comprises either:
the first device providing the information that may be used by the one or more processors to identify a location; or
the one or more processors receiving the information that may be used by the one or more processors to identify a location from one or more servers, the one or more servers storing information that may be used to identify a location;
wherein the virtual environment is representative of the identified location; and
wherein the virtual environment is to some extent explorable by the user using the second user device.

17. A method according to claim 16 further comprising presenting to the user, using the second device, one or more virtual objects, the virtual objects being presented as objects within the virtual environment, the virtual objects being capable of being interacted with by the user.

18. A method according to claim 17:
wherein each virtual object corresponds to an object within the multimedia presentation;
the method further comprising:
changing one or more properties of a virtual object within the virtual environment in response to a change, in the multimedia presentation, to one or more properties of the object that corresponds to that virtual object; or
in response to the user interacting with a virtual object within the virtual environment, changing, in the multimedia presentation, one or more properties of the object that corresponds to that virtual object.

19. Apparatus for augmenting a user's multimedia consumption experience, the user being a user of a first user device and of a second user device, the user using the first device to consume a multimedia presentation, the apparatus comprising one or more processors arranged to:
use information to identify a location relevant to at least part of the multimedia presentation;
acquire a virtual environment, the virtual environment being representative of the identified location;
acquire one or more virtual objects, the virtual objects relating to at least part of the multimedia presentation;
determine, for each virtual object, a position for that virtual object within the virtual environment;
for each virtual object, include, in the virtual environment at the position within the virtual environment determined for that virtual object, that virtual object; and
present to the user, using the second device, the virtual environment with the one or more virtual objects included therein;
wherein the virtual environment is to some extent explorable by the user using the second user device; and
wherein the virtual objects within the virtual environment are capable of being interacted with by the user.

20. Apparatus for augmenting a user's multimedia consumption experience, the user being a user of a first user device and of a second user device, the user using the first device to consume a multimedia presentation, the apparatus comprising one or more processors configured to:
receive information for identifying a location, the location being relevant to at least part of the multimedia presentation;
identify the location;
acquire a virtual environment; and
present to the user, using the second device, the virtual environment;
wherein the information that may be used by the one or more processors to identify a location is either:
received from the first device; or
received from one or more servers, the one or more servers storing information that may be used to identify a location;

wherein the virtual environment is representative of the identified location; and wherein the virtual environment is to some extent explorable by the user using the second user device.

* * * * *